(12) United States Patent
Siddeeq

(10) Patent No.: US 7,307,620 B2
(45) Date of Patent: Dec. 11, 2007

(54) ONE-HANDED THUMB-SUPPORTED MOBILE KEYBOARD

(76) Inventor: Shakoor N. Siddeeq, 100 Camellia La. Apt 917, Lithonia, GA (US) 30058

( * ) Notice: Subject to any disclaimer, the term of this patent is extended or adjusted under 35 U.S.C. 154(b) by 548 days.

(21) Appl. No.: 11/051,849

(22) Filed: Feb. 4, 2005

(65) Prior Publication Data

US 2005/0140648 A1    Jun. 30, 2005

Related U.S. Application Data

(63) Continuation-in-part of application No. 10/419,542, filed on Apr. 19, 2003, now Pat. No. 6,970,157.

(60) Provisional application No. 60/541,824, filed on Feb. 5, 2004.

(51) Int. Cl.
   *G09G 5/00* (2006.01)

(52) U.S. Cl. .................. 345/169; 345/156; 345/157; 345/168

(58) Field of Classification Search ................ 345/156, 345/157, 168, 169
   See application file for complete search history.

(56) References Cited

U.S. PATENT DOCUMENTS

| | | | |
|---|---|---|---|
| 4,988,981 A | 1/1991 | Zimmerman et al. | |
| 5,305,181 A | 4/1994 | Schultz | |
| 5,514,861 A | 5/1996 | Swartz et al. | |
| 5,581,492 A | 12/1996 | Janik | |
| 5,668,574 A * | 9/1997 | Jarlance-Huang | 345/158 |
| 5,796,354 A | 8/1998 | Cartabiano et al. | |
| 6,097,374 A | 8/2000 | Howard | |
| 6,155,841 A * | 12/2000 | Spanyar | 439/37 |
| 6,167,413 A | 12/2000 | Daley, III | |
| 6,222,677 B1 | 4/2001 | Budd et al. | |
| 6,970,157 B2 * | 11/2005 | Siddeeq | 345/168 |

(Continued)

FOREIGN PATENT DOCUMENTS

JP    9152934    6/1997

OTHER PUBLICATIONS

Wrist PC wearable computer, www.L3sys.com, unknown date.
Halfkeyboard, www.halfkeyboard.com, unknown date.

*Primary Examiner*—Richard Hjerpe
*Assistant Examiner*—My-Chau T. Tran
(74) *Attorney, Agent, or Firm*—Law Offices of Michael Dryja

(57) ABSTRACT

A one-handed thumb-supported mobile input device for a computing device includes an input mechanism and a thumb loop or an elastic band in which a thumb of a hand may be inserted. The thumb loop or elastic band is attached to an adjustable thumb loop holder that is enclosed within a thumb loop holder and is adjustable with respect to the thin sections of the input mechanism. The thumb loop holder is attached to one of the sections of the input mechanism. The input mechanism has a folded position and an unfolded position, and includes a number of thin sections containing a number of keys, and which may have one or more folds. The device may further include a display mechanism having a folded position and an unfolded position, and including a thin section containing a display and that is foldable with respect to the sections of the input mechanism.

11 Claims, 5 Drawing Sheets

U.S. PATENT DOCUMENTS

| | | |
|---|---|---|
| 2001/0043514 A1 | 11/2001 | Kita |
| 2002/0024500 A1 | 2/2002 | Howard |
| 2002/0101401 A1* | 8/2002 | Movahed .................... 345/156 |
| 2002/0145948 A1 | 10/2002 | Meylan et al. |
| 2003/0174124 A1* | 9/2003 | How .......................... 345/167 |
| 2003/0214481 A1* | 11/2003 | Xiong ....................... 345/157 |
| 2006/0012566 A1* | 1/2006 | Siddeeq ..................... 345/156 |

* cited by examiner

ONE-HANDED THUMB-SUPPORTED MOBILE KEYBOARD

RELATED APPLICATIONS

The present patent application claims priority to the provisional patent application filed on Feb. 5, 2004, and assigned Ser. No. 60/541,824. The present patent application is also a continuation in part of the patent application filed on Apr. 19, 2003, and assigned Ser. No. 10/419,542, issued as U.S. Pat. No. 6,970,157, which is hereby incorporated by reference.

FIELD OF THE INVENTION

This invention relates generally to computing, input, and/or display devices, and more particularly to such devices that are wearable by the user.

BACKGROUND OF THE INVENTION

Using computers has become a ubiquitous activity in today's society. Many users require constant access to their computing devices to maintain their professional or personal lives. For some users, this means that they are tethered to their desktop computers all day long. For other users, this means that they constantly carry laptop or notebook computers that they can access. Still other users carry personal-digital assistant (PDA) devices or cellular phones all day long.

All of these solutions, however, present disadvantages to users to some degree. Users who rely solely upon desktop computers cannot access them when they are away from the places in which the desktop computers are located. Users who rely upon laptop or notebook computers have to lug them around everywhere they go. Even the latest generation of such portable computers are still somewhat unwieldy and heavy to be constantly carried. PDA devices and cellular phones are easily misplaced and lost, and some of these devices are overly large and difficult to store.

A new field of computers and input devices for computers that attempts to overcome these difficulties is the wearable computer or input device. A wearable computer is a computing device that a user literally wears on his or her body, as if it were, for example, a piece of clothing, a piece of jewelry, or a wristwatch. A wearable input device is an input device for a computer that a user wears on his or her body. Current wearable computer and input devices designs, however, are less than ideal. For a wearable computer or input device to be truly useful, the user should be able to easily view and input data when desired, but the wearable computer or input device should otherwise not get in the way of day-to-day activities. However, current wearable computer and input device designs are often unwieldy, and fail these design objectives, either not allowing the user to both easily view and input data, and/or not being readily put out of the way when not needed.

For these and other reasons, therefore, there is a need for the present invention.

SUMMARY OF THE INVENTION

The invention relates to a one-handed thumb-supported mobile keyboard. It allows for mobile data input in any position, standing, sitting, or lying down. Embodiments of the invention may be incorporated into a mobile phone or other device with a flip lid LCD to allow for quick mobile one-handed data entry and or operated as a wired or wireless keyboard that communicates with an external device. Embodiments of the invention allow for the incorporation of a QWERTY based key layout to provide users with a familiar keyboard interface. Embodiments of the invention also allow users to type with four fingers per hand with an option of using all five fingers of the hand while holding the device in any position and also providing a QWERTY based key layout. The option for utilization of other key layouts may also be incorporated. Still other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

It is noted that like reference numbers among the figures identify identical components of the computing device depicted in the figures. As a result, in any given figure more reference numbers may be indicated than are described in the detailed description for that figure. However, the components identified by these reference numbers are described in relation to other figures, and such description may be referenced to determine the functionality and identification of the components in figures in which the reference numbers for these components are not particularly described.

Figure 1:
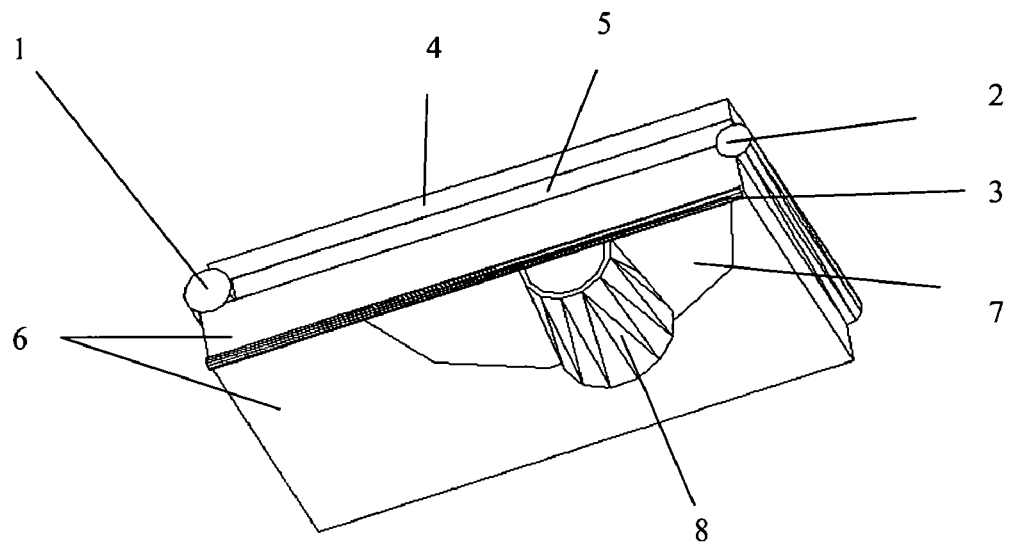
FIG. 1 depicts a bottom angle view of a device folded in its unused state with the thumb loop 8 clearly visible, according to an embodiment of the invention.
Figure 2:
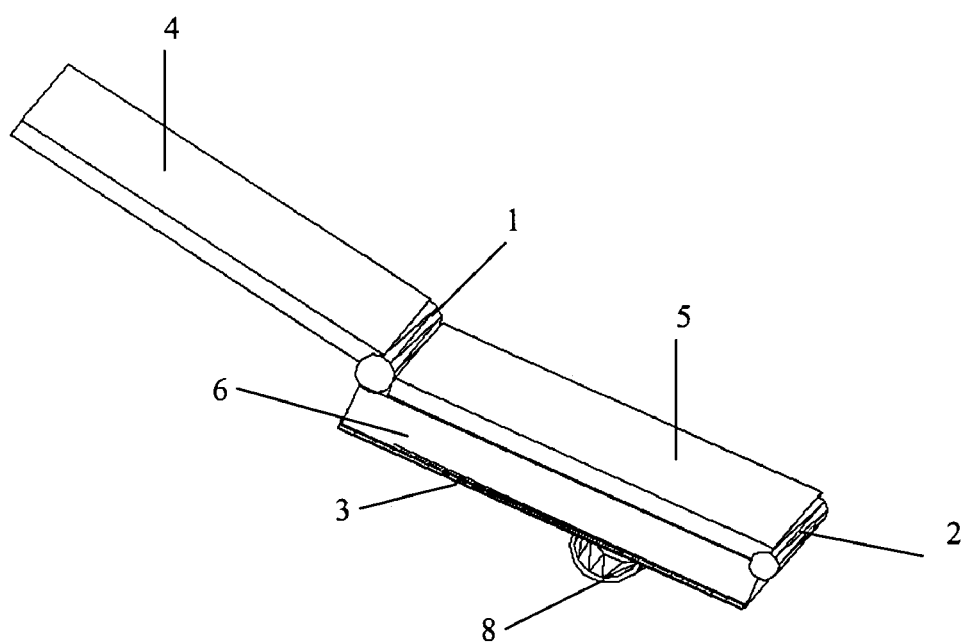
FIG. 2 depicts an angled view of a device with the LCD flip lid 4 open and phone keypad 5 exposed for use as a mobile phone, according to an embodiment of the invention.

One embodiment of the device may incorporate a mobile phone form factor as shown in FIG. 1 and FIG. 2. FIG. 1 shows a flip lid LCD type mobile phone with the flip lid LCD 4 closed over top of the phone keypad 5. FIG. 2 shows the flip lid LCD 4 open for use as a mobile phone, exposing the phone keypad 5. The number and type of keys on the phone keypad 5 may vary and are not depicted. The flip lid LCD 4 may be flexibly physically and electrically connected to the structural housing 6 via a flip hinge 1 about whose axis it may rotate. The structural housing 6 may contain the power supply and other electronics necessary for operation of the device. The flip lid LCD 4 may also rotate about a second axis perpendicular to the flip hinge 1 axis via an additional friction or torque hinge incorporated into the flip hinge 1 to allow for a better viewing angle. The flip lid LCD 4 may incorporate a second optional flip hinge or torque hinge parallel to flip hinge 3 yet on the opposite side of the structural housing 6. The user would then have the option via a physical sliding selection mechanism to engage the flip lid LCD 4 with either flip hinge 1 or this additional flip hinge thus allowing for different viewing orientations of the flip lid LCD 4 about different axis. In all cases, the flip hinges and or torque hinges may flexibly physically and or electrically connect the flip lid LCD 4 to the structural housing 6.

Figure 3:
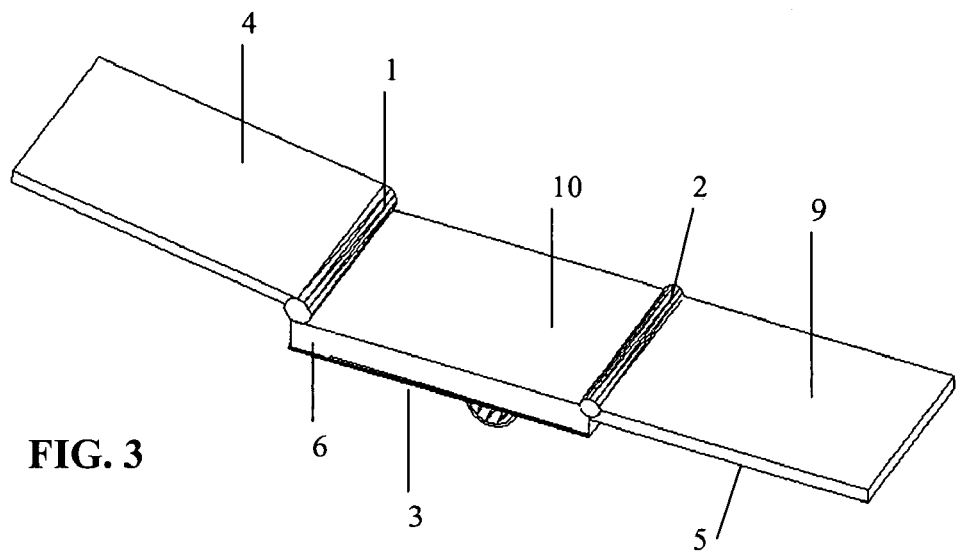
FIG. 3 depicts an angled view of a device with the LCD flip lid 4 open, left side keyboard 10 and right side keyboard 9 exposed, and phone keypad 5 hidden from view on the backside of the right side keyboard 9, according to an embodiment of the invention.
Figure 4:
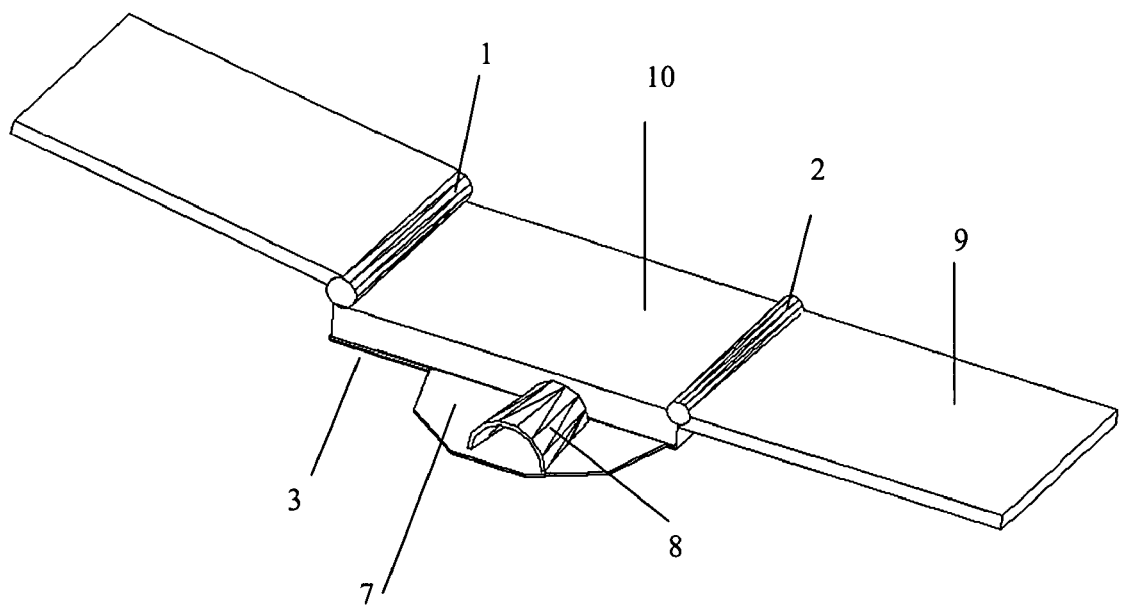
FIG. 4 depicts an angled view of a device extended for use as a keyboard with the LCD flip lid 4 open, left side keyboard and right side keyboard 9 exposed, and thumb loop 8 and thumb loop holder 7 unfolded, according to an embodiment of the invention.

FIG. 3 and FIG. 4 show the mobile phone form factor transforming into a keyboard with LCD form factor, according to an embodiment of the invention. The phone keypad 5 may rotate about flip hinge 2 such that it faces down and is hidden from view to expose the left side keyboard 10 and the right side keyboard 9. Flip hinge 2 may physically and or electrically flexibly connect the left side keyboard 10 and structural housing 6 to the right side keyboard 9. The left side keyboard 10 may be located on top of the structural housing 6. The right side keyboard 9 may be located on the backside of the phone keypad 5. In addition, the left side keyboard 10 may have a soft thin cushion material attached to its underside to absorb shock from key presses.

Depicted in FIG. 4, flip hinge 3 may physically and or electrically flexibly connect the thumb loop holder 7 to the structural housing 6. Flip hinge 3 may be a flip hinge and or torque hinge. In addition, the thumb loop holder 7 and flip hinge 3 may slide and or rotate out from a hollow slot within the structural housing 6 and thereby allow for easier accessibility and storage when not extended. Thumb loop holder 7 may be made to be longer, thicker, and or wider and may contain keys such as a space bar and may also contain the power supply or electronics for the device. The thumb loop 8 may be composed of an elastic material and may also have a soft thin cushion material on its base bottom and or fully encasing its inner lining.

Figure 5:
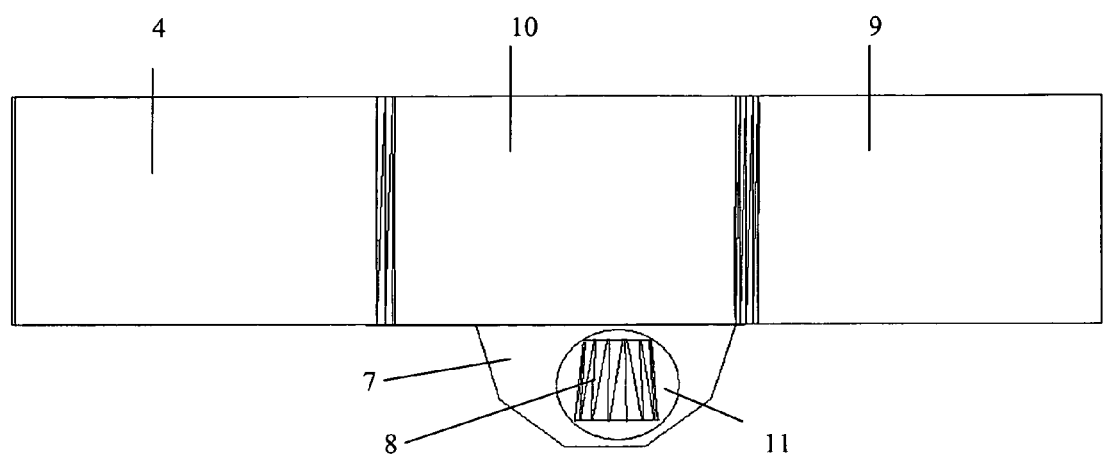
FIG. 5 depicts a top view of a device extended for use as a keyboard with an adjustable thumb loop holder 11 enclosed within the thumb loop holder 7, according to an alternative embodiment of the invention.

FIG. 5 shows the device with a removable and adjustable thumb loop holder 11 enclosed within the thumb loop holder 7, according to an embodiment of the invention. The adjustable thumb loop holder allows for the adjustment of the thumb loop 8 with respect to the left side keyboard 10, right side keyboard 9, and keys and or structural housing 6. This allows users to adjust and customize the typing position when using the keyboard. The adjustable thumb loop holder 11 adjusts by rotation within the thumb loop holder 7. Small deformable curved ridges (may be parallel and or perpendicular to the plane of the adjustable thumb loop holder 11) may be located on the edge of the adjustable thumb loop holder 11. Grooves may be located on the edge (may be parallel and or perpendicular to the plane of the thumb loop holder 7) of the thumb loop holder 7 at various points of contact between them both. Rotation of the adjustable thumb loop holder 11 aligns and misaligns the deformable curved ridges and grooves thereby alternately locking and unlocking the adjustable thumb loop holder 11 in place. The deformable curved ridges may be made of a polymer and or rubber based material. In addition, a locking and unlocking mechanism may be used to manually unlock or lock the adjustable thumb loop holder 11 to facilitate easy replacement. Alternatively, the adjustable thumb loop holder 11 may be able to freely rotate within the thumb loop holder 7. In such an embodiment, the adjustable thumb loop holder 11 and the thumb loop holder 7 may utilize a male-female engaging and disengaging spring loaded locking mechanism to allow (unlock) or prevent (lock) free rotation of the adjustable thumb loop holder 11. In addition, the length of thumb loop 8 available for insert by the user's thumb may be increased or decreased by passing the thumb loop 8 through a slot in the adjustable thumb loop holder 11 to the underside of the adjustable thumb loop holder 11 and fastening and unfastening it using Velcro or another suitable material.

Flip hinge 3 may be coupled with an additional torque hinge attached at any point perpendicular to its axis such that thumb loop holder 7 may rotate about an additional axis perpendicular to that of flip hinge 3. This additional axis would allow for the device to be operated with the thumb loop holder 7 being only partially unfolded while providing for greater support should the user desire to type standing up while holding the device near the face or upper body.

In an alternative embodiment flip hinge 2 may be removed such that the device no longer folds at that point and the combined lengths of the left side keyboard 10 and right side keyboard 9 may be altered to match that of the flip lid LCD 4.

In another alternative embodiment, flip lid LCD 4 and flip hinge 1 may be removed such that phone keypad 5 becomes a cover. This may have the device function as a data input device that would interface with an external device via wires or wirelessly.

In another alternative embodiment, flip lid LCD 4, flip hinge 1, and flip hinge 2 may be removed and the length and shape of the thumb loop holder 7 may be altered to match that of the combined lengths of the left side keyboard 10 and right side keyboard 9. Thumb loop holder 7 may fold or collapse on top of the left side keyboard 10 and right side keyboard 9 as a cover such that thumb loop 8 is not visible until thumb loop holder 7 is unfolded. Alternatively, the thumb loop holder may not act as a cover and simply fold beneath the structural housing 6. The device would function as a data input device that would interface with an external device via wires or wirelessly.

Figure 6:
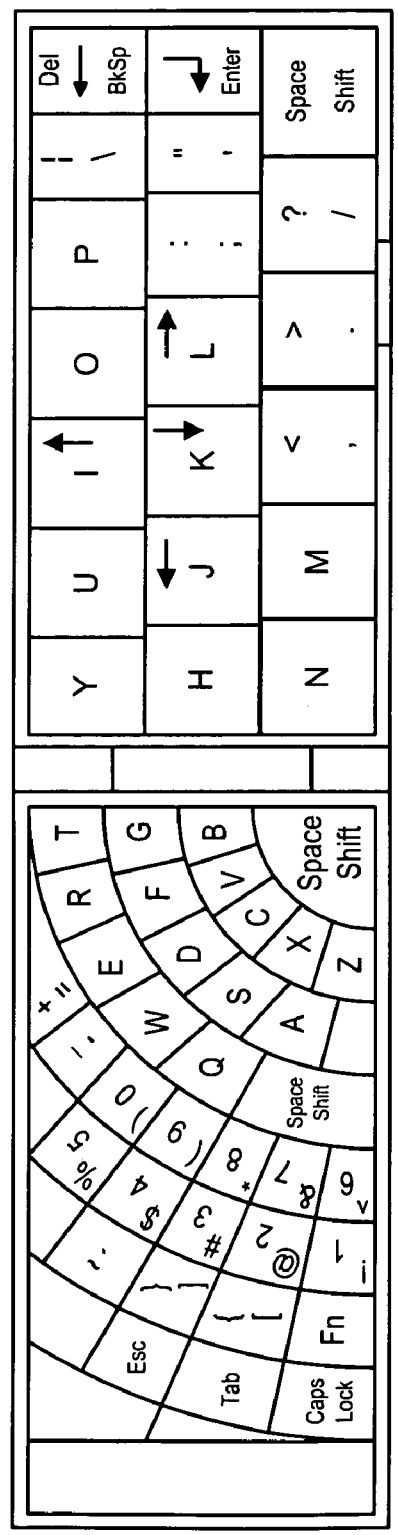
FIG. 6 depicts a top view of a device showing a right-handed QWERTY key layout for the left side keyboard 10 and the right side keyboard 9, according to an embodiment of the invention.

FIG. 6 shows a key layout based on the QWERTY layout, according to an embodiment of the invention. The keys on the right side keyboard 9 are the keys normally used by the right hand when typing on a standard QWERTY based keyboard. The keys on the left side keyboard 10 are the keys normally used by the left hand. The left side keyboard 10 keys have been curved about a curved radius to allow for the fingers of the right hand to easily reach them with minimum extension.

The device of one embodiment of the invention, as depicted in the figures show a right handed based key layout and structure. The device may be used by placing the right hand thumb into the thumb loop 8 and using slight lateral movement or bending of the digit of the thumb in combination with slight left based reaching of the fingers of the right hand to reach the leftmost keys on the left side keyboard 10. The keys shape and or structure may have a ramped and or raised convex and or concave curvature to allow for easier reach and identification during data entry. Other key layouts other than the QWERTY layout may be utilized. Fn key allows access to the up, down, left, right arrow keys in the layout depicted in FIG. 6. Numeric keys may be accessed via the Fn or function key as opposed to having their own separate keys in order to save space. The keys marked both Shift and Space work as a shift key when pressed in conjunction with another key and work as a Space bar when pressed individually. Other custom keys may be added where no labeled key exists.

Figure 7:
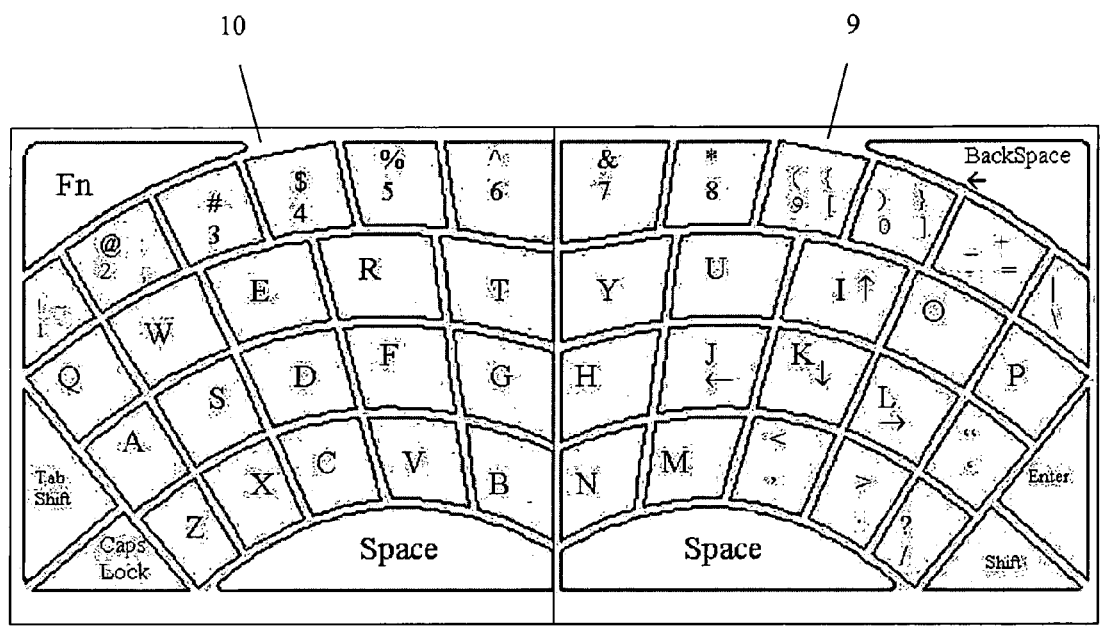
FIG. 7 depicts a top view section of a device without flip hinge 2 and having a symmetrical ambidextrous QWERTY keyboard layout, according to an alternative embodiment of the invention.

FIG. 7 shows an ambidextrous symmetrical QWERTY key layout with flip hinge 2 removed, according to an alternative embodiment of the invention. In this alternative embodiment the keys are designed for use with either the left or right hand and are arranged in a QWERTY symmetrical layout for easy reach and familiarity.

Although the drawings depicted represent the device in the embodiment as it may be used by the right hand, it should be apparent by those skilled in the art that appropriate rearrangement of the left and right side key layout, thumb loop holder 7, and or flip lid LCD 4 would be sufficient to accommodate left handed use.

It should be noted by those skilled in the art that the device has been described with reference to a preferred embodiment and or embodiments and that the materials, operating mechanisms, properties, sizes, shapes, types, and other characteristics of the components that are not depicted or described are trivial and numerous variations of these exist which may be used to construct the device without changing the spirit and scope of the invention.

Furthermore, it is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. A one-handed thumb-supported mobile input device for a computing device comprising:
   an input mechanism comprising one or more thin sections, each section containing a plurality of keys, the thin sections having one or more folds with an unfolded position and folded position;
   one of a thumb loop and an elastic band into which a thumb of a hand of a user is inserted;
   an adjustable thumb loop holder to which the one of the thumb loop and the elastic band is attached; and,
   a thumb loop holder section enclosing the adjustable thumb loop holder and within which the adjustable thumb loop holder is able to rotate, the thumb loop holder section being attached to the input mechanism.

2. The device of claim 1, wherein the plurality of keys of the plurality of thin sections comprise a plurality of alphanumeric keys organized in QWERTY fashion.

3. The device of claim 1, further comprising a display mechanism having a folded position and an unfolded position, the display mechanism comprising a thin section containing a display, the thin section foldable with respect to the thin sections of the input mechanism.

4. The device of claim 3, wherein a first of the thin sections of the input mechanism is foldable over a second of the thin sections of the input mechanism, and the thin section of the display mechanism is foldable over the first of the thin sections of the input mechanism.

5. The device of claim 1, wherein in the folded position the sections of the input mechanism are one of collapsed and folded on top of one another such that the plurality of keys of each section is one of compressed and sandwiched in between the sections,
   and wherein in the unfolded position the sections of the input mechanism are unfolded such that the plurality of keys of each section is exposed and useable by the user in the one-handed manner,
   lateral movement of the thumb rotating the sections of the input mechanism about an axis perpendicular to a plane of the sections such that lateral movement of the fingers of the hand substantially decreases.

6. The device of claim 1, wherein the device is integrated into a mobile phone.

7. A thumb-held mobile computing device comprising:
   an input mechanism having a folded position and an unfolded position, the input mechanism comprising one or more thin sections, each section containing a plurality of keys, the thin sections having one or more folds;
   a display mechanism having a folded position and an unfolded position, the display mechanism comprising a thin section containing a display, the thin section foldable with respect to the thin sections of the input mechanism; and,
   one of a thumb loop and an elastic band into which a thumb of a hand of a user is inserted attached to an adjustable thumb loop holder, the adjustable thumb loop holder being enclosed within a thumb loop holder section within which the adjustable thumb loop holder is able to rotate, the thumb loop holder section being attached to one of the sections of the input mechanism.

8. The computing device of claim 7, wherein the plurality of keys of the plurality of thin sections comprise a plurality of alphanumeric keys organized in QWERTY fashion.

9. The computing device of claim 7, wherein a first of the thin sections of the input mechanism is foldable over a second of the thin sections of the input mechanism, and the thin section of the display mechanism is foldable over the first of the thin sections of the input mechanism.

10. The computing device of claim 7, wherein in the folded position the sections of the input mechanism are one of collapsed and folded on top of one another such that the plurality of keys of each section is one of compressed and sandwiched in between the sections,
    and wherein in the unfolded position the sections of the input mechanism are unfolded such that the plurality of keys of each section is exposed and useable by the user in the one-handed manner,
    lateral movement of the thumb rotating the sections of the input mechanism about an axis perpendicular to a plane of the sections such that lateral movement of the fingers of the hand substantially decreases.

11. The computing device of claim 7, wherein the computing device is a mobile phone.

* * * * *